Jan. 16, 1934.　　　J. D. ELMS　　　1,943,378
MOTION PICTURE CAMERA
Filed July 3, 1931　　　3 Sheets-Sheet 1

INVENTOR
John D. Elms
BY
Ward, Crosby & Neal
ATTORNEYS

Jan. 16, 1934.    J. D. ELMS    1,943,378
MOTION PICTURE CAMERA
Filed July 3, 1931    3 Sheets-Sheet 2
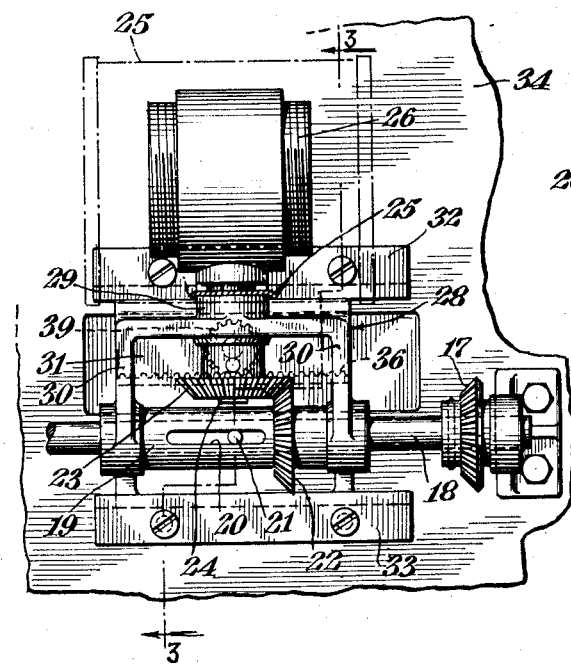
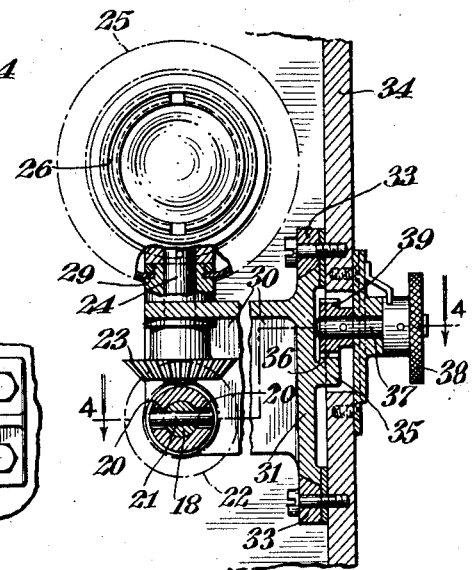
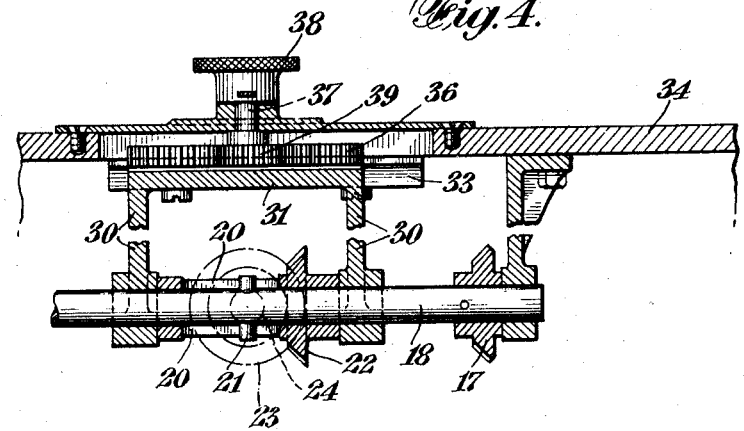
INVENTOR
*John D. Elms*
BY
*Ward, Crosby + Neal*
ATTORNEYS Jan. 16, 1934. J. D. ELMS 1,943,378
MOTION PICTURE CAMERA
Filed July 3, 1931    3 Sheets-Sheet 3
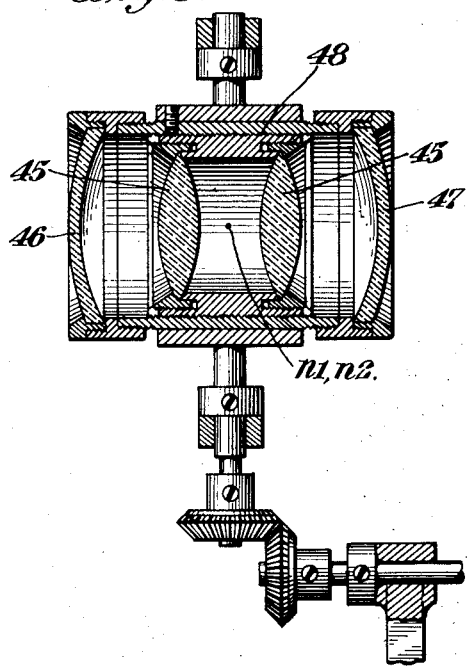
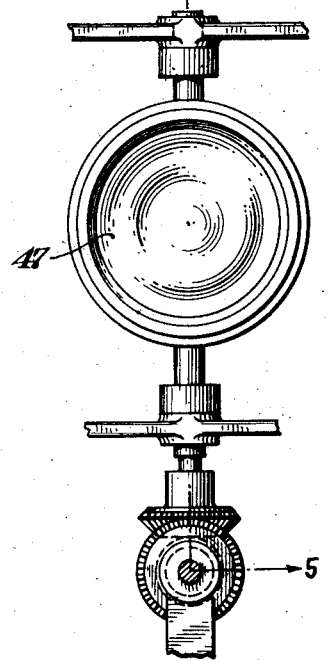
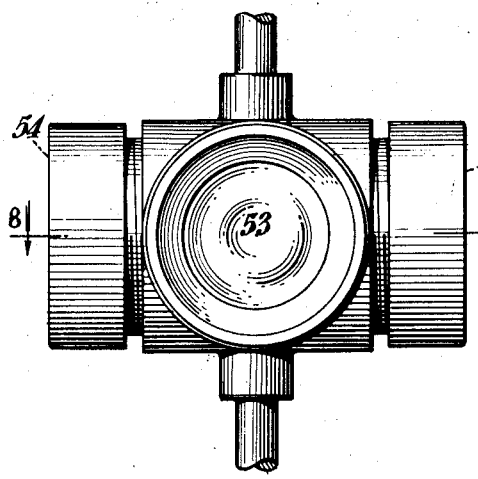
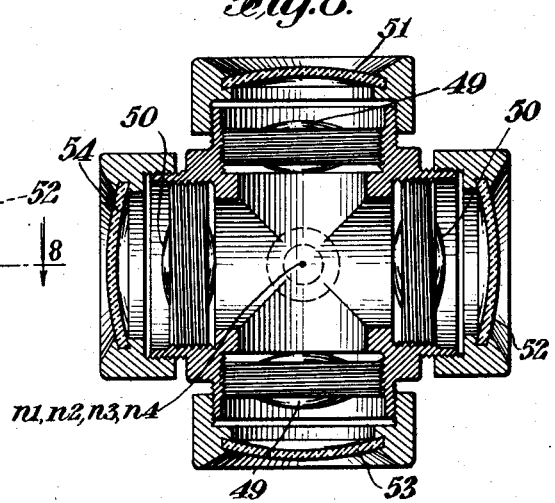
INVENTOR
John D. Elms
BY
Ward, Crosby + Neal
ATTORNEYS Patented Jan. 16, 1934

1,943,378

UNITED STATES PATENT OFFICE 1,943,378

MOTION PICTURE CAMERA

John D. Elms, Staten Island, N. Y., assignor to Films Revo Corporation, New York, N. Y., a corporation of New York Application July 3, 1931. Serial No. 548,539

14 Claims. (Cl. 88—16)

My invention relates to motion picture cameras and refers particularly to motion picture cameras having rotating multi-way symmetrical lenses of the type shown in my application Ser. No. 268,903, filed April 10, 1928, of which this application is a continuation in part.

By a two-way, four-way or multi-way lens I mean a lens so constructed that light from a scene entering any end passes through the lens to the film and produces an image identical in size, shape and definition as light passing through any of the other ends. By a one-way lens I mean a lens which even if capable of taking pictures through any of its ends would not produce images identical as to each of the properties stated.

While one-way rotating lenses have valuable attributes in motion picture cameras, their practical application is difficult.

As the arc of rotation of a one-way lens, of the type heretofore used during non-exposure of the film, is much longer than during exposure of the film, proper mechanical arrangements must be made whereby the period of time consumed by passage of the lens across the film face is sufficient to allow of perfect photography, and whereby the time of passage of the lens around its arc of non-exposure is sufficiently short to allow of a proper number of exposures within a specified period of time, in order that the projection of the plurality of photographs will present a continuity of individual pictures having the appearance of a continuous motion of the photographic images.

In the case of one-way lenses, this necessitates the incorporation of mechanism which will rotate the lens at an accelerated speed during the non-exposure period and a retarded and preferably uniform speed during the exposure period. This mechanism usually sets up vibrations in the camera.

As a motion picture camera must be free from movement and vibration during its operation, any device which will reduce, or entirely remove this objectionable feature, is of great advantage and value.

My device presents a means whereby the rotation of the camera lens may be uniform, while, at the same time, allowing sufficient periods of exposure and non-exposure, thus overcoming the above mentioned vibration and dispensing with all the mechanism incident to varying speeds of lens rotation.

I have found that a practically vibrationless movement may be given the lens of a motion picture camera, while, at the same time, providing the necessary periods of exposure and non-exposure, by employing a multi-way lens, which may comprise a combination of lens elements so arranged and with such relationship to each other that it will make photographic images of equal photographic value in each direction therethrough, the combination having the same degree of magnification, the same focal length and the same covering power in each direction.

It is evident that in the use of a two-way lens, for example, a photographic image will be made at each half rotation of the lens, while in the use of the ordinary one-way lens a single image will be made at each complete rotation thereof, and that, therefore, by the use of a two-way lens, the period of exposure may be greatly increased and the period of non-exposure may be greatly reduced and the necessity of rotation acceleration may be avoided.

My invention, therefore, consists in overcoming the necessity of a change of speed of lens rotation by increasing in effect the number of lenses in such a manner that a complete rotation of the lens will allow of more than one photographic impression.

Further, it is evident that a four-way lens permits of a larger number of photographic impressions being taken during a single rotation of the lens than does a two-way lens, thus increasing the period of exposure and decreasing the period of non-exposure over that of the two-way lens.

The above mentioned, and other, valuable features of my invention will be evident upon a consideration of my specifications and its accompanying drawings.

In the accompanying drawings, illustrating lenses constructed in accordance with the principle of my invention, similar parts are designated by similar numerals.

Fig. 2 is a side view of the lens rotating mechanism;

Figure 3 is a section on the line 3—3 of Fig. 2;

Fig. 4 is a section on the line 4—4 of Fig. 3;

Fig. 5 is a section on the line 5—5 of Fig. 6;

Fig. 6 is an end view of a two-way lens having supplemental focusing lenses;

Fig. 7 is an end view of a four-way lens; and

Fig. 8 is a section on the line 8—8 of Fig. 7.

Figure 1:
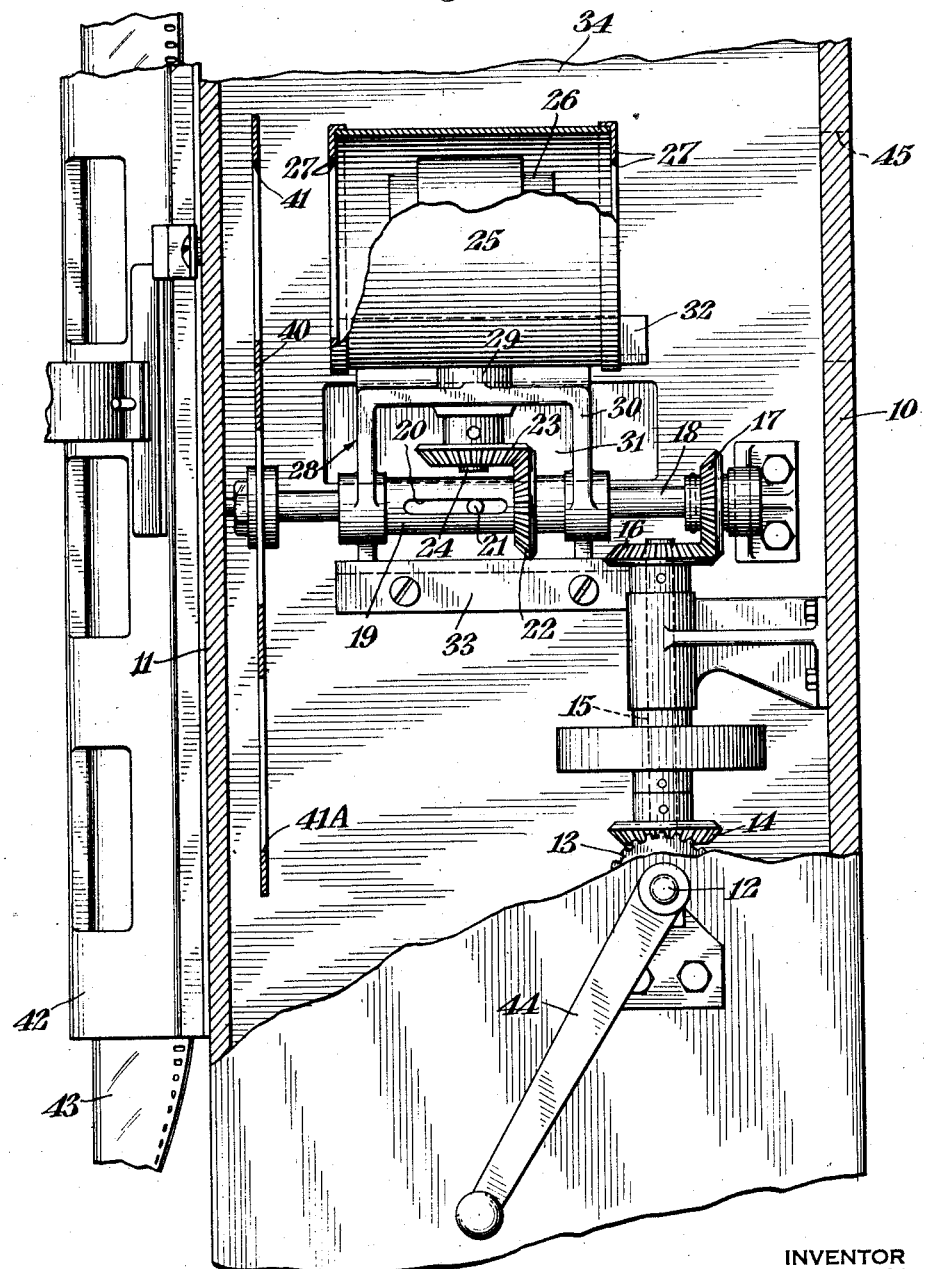
Fig. 1 is a side view of one form of the device of my invention, partly in section for clearness of illustration.

The particular form of the device of my invention, illustrated in Figs. 1 to 4 of the accompanying drawings, comprises a camera casing, the front 10 and the back 11 of which are shown.

Supported in the side walls of the casing is a horizontal driving shaft 12 which carries a bevel gear 13 in mesh with a bevel gear 14 on a vertical shaft 15 suitably journaled in a bracket on the casing, the latter carrying a bevel gear 16 in mesh with a bevel gear 17 on a horizontal shaft 18 suitably supported on the casing, as shown. Slidable upon the shaft 18 is a sleeve 19 having opposite slots 20 and 20 therein, through which extends a pin 21 passing through and secured to the shaft 18. The sleeve 19 carries a bevel gear 22 in mesh with a bevel gear 23 on a vertical shaft 24.

The shaft 24 carries a housing 25 within which is a two-way lens 26, the housing 25 having end openings 27 and 27. A yoke 28 slidable on the shaft 18 carries a bearing 29 in which the shaft 24 rotates. The arms 30 and 30 of the yoke 28 carry a plate 31, slidable within guides 32 and 33, fixedly attached to the casing end 34, and an extension 35 of the plate 31 carries a rack 36. A shaft 37 carries an exterior finger grip 38 and an interior pinion 39 in mesh with the rack 36.

The shaft 18 carries a shutter 40, having two oppositely positioned openings 41 and 41A. The use of the shutter obviously is optional as the housing 25 and the opening in the casing may be wholly relied on to perform this function. The shutter may be constructed as shown in my Letters Patent No. 1,783,463, dated December 2, 1930.

Secured to the camera casing is a curved film shield and guide 42, within which is a film 43 intermittently movable by any well-known and suitable means employed for effecting intermittent movement of films in motion picture cameras, the specific moving means not being shown, as I make no claim to any particular means for this purpose.

The shaft 12 carries a handle 44, by means of which the lens and shutter may be operated.

The operation of my device is as follows: When the handle 44 is turned it rotates the shaft 18, which through the medium of the bevel gears 22 and 23 rotates the lens housing 25 and the two-way lens 26.

When the device is in the position shown in Fig. 1, the light passes through an opening 45 in the front wall 10 of the casing, through the lens and the opening 41 of the shutter 40, making a photographic image upon the film 43.

During a further rotation of the lens 26, the shutter 40 cuts off the light from the film, during which period of non-photography, the film 43 moves downwardly the desired distance, until the position of the lens is reversed, when the light passes through the opening 45, the lens 26 and the shutter opening 41A.

It will thus be seen that two photographic images are impressed upon the film 43 during one rotation of the lens, the film moving the desired distance during the non-exposure period.

When it is desired to focus the lens, either during its rotation, or when it is at rest, the finger grip 38 is rotated, which, through the medium of the pinion 39 and the rack 36 moves the member 28 carrying the lens housing 25 and the lens 26 to or away from the film 43.

In the modification, shown in Figs. 5 and 6, the two-way lens comprising the lens elements 45 and 45 is focused by means of supplemental focusing lenses 46 and 47 removably attached to the lens holder 48. In this construction, the focusing must be done while the lens is at rest.

The modification shown in Figs. 7 and 8 is a four-way lens consisting of two two-way lenses comprising respectively lens elements 49 and 49 and 50 and 50. The lens may be focused by supplemental focusing lenses 51, 52, 53 and 54. A rotation of this lens causes four photographic images to be made, the shutter used in connection therewith having four openings therein in alignment with the lens in each photographic position.

The two-way lens objective shown in Figs. 1 to 6 comprises a symmetrical doublet, and is preferably so designed that both its nodal points $n1$, $n2$ are coincident with its mechanical center and the axis of rotation. It is obvious that, since the doublet is symmetrical, it can be turned end for end without affecting the system. Coincident location of the nodal points prevents shifting of the image or parts thereof.

The lens shown in Figs. 7 and 8 comprises two crossed two-way symmetrical lenses or doublets, the axes of which are at right angles to each other. These are preferably so designed that the central space of each doublet is sufficient to permit the full aperture of the complementary doublet to be utilized across it. Both nodal points of both doublets $n1$, $n2$, $n3$ and $n4$ are preferably coincident with the mechanical center and the axis of rotation. In this system four exposures are permitted during each rotation of the lens system, to produce four images of equal size and definiteness.

It will thus be seen that by my device, a plurality of photographic images can be made at each rotation of the lens, accomplishing the highly valuable and novel results set forth and described herein.

By photographic value as used in the claims, I mean images of the same degree of magnification, definition and photographic quality.

I do not limit myself to the particular size, shape, number, or arrangement, of parts as shown and described, as these are given simply as a means for clearly describing the device of my invention.

What I claim is:

1. In a motion picture camera, a multi-way rotatably mounted lens capable of making a plurality of photographic images of equal photographic value during each rotation, and means for rotating said lens to present its ends successively toward a scene.

2. In a motion picture camera, a multi-way rotatably mounted symmetrical lens with its nodal points coincident capable of making a plurality of photographic images of equal photographic value during each rotation upon successive frames of an intermittently moving photographic film.

3. In a motion picture camera, in combination, a camera casing, a multi-way lens rotatable within said casing, and means for rotating said lens for making a plurality of images of equal photographic value of the same scene upon a film during each rotation of said lens.

4. In a motion picture camera, in combination, a camera casing, a multi-way lens rotatable within said casing, means for rotating said lens for making a plurality of images of equal photographic value of the same scene upon a film during each rotation of said lens, and means for focusing said lens with respect to said film.

5. In a motion picture camera, in combination, a camera casing, a multi-way lens rotatable within said casing, means for rotating said lens for making a plurality of images of equal photographic value of the same scene upon a film during each rotation of said lens, and means for focusing said lens with respect to said film during the rotation of said lens.

6. In a motion picture camera, in combination, a camera casing, a multi-way lens rotatable within said casing, means for rotating said lens for making a plurality of photographic images of equal photographic value of the same scene upon the film during each rotation of said lens, said shutter, and means for opening a shutter at each alignment of the lens with said film.

7. In a motion picture camera, in combination, a camera casing, a multi-way lens rotatable within said casing, means for rotating said lens for making a plurality of photographic images of equal photographic value of the same scene upon the film during each rotation of said lens, a shutter, means for opening said shutter at each alignment of the lens with said film, and means for focusing said lens with respect to said film.

8. In a motion picture camera, in combination, a camera casing, a two-way lens rotatable within said casing, and means for rotating said lens for making a photographic image of a scene upon an intermittently movable film during each of its stationary periods.

9. In a motion picture camera, in combination, a camera casing, a four-way lens rotatable within said casing, and means for rotating said lens for making a photographic image of a scene upon an intermittently movable film during each of its stationary periods.

10. In a motion picture camera, in combination, a camera casing, a multi-way lens rotatable within said casing, means for rotating said lens for making a photographic image upon an intermittently movable film during each of its stationary periods, a plurality of such images of equal photographic value being made during each rotation of said lens, and means for focusing said lens with respect to said film during the rotation of said lens.

11. An optical system for a motion picture camera including a rotatable objective, characterized in that the two nodal points of the objective are coincident with the axis of rotation.

12. An optical system for a motion picture camera including a rotatable objective, characterized in that the rotatable objective is completely symmetrical and the nodal points thereof are coincident with the axis of rotation.

13. An optical system comprising two similar symmetrical doublets mounted on a common rotatable support with their axes positioned at right angles to each other, each doublet having its nodal points coincident at the axis of rotation of the support, and the axes of the doublets intersecting at the same point.

14. An optical system for a motion picture camera including a rotatable objective, characterized in that the two nodal points of the objective are coincident, in combination with means for rotating the objective on an axis of rotation at right angles to the optical axis of the objective and coincident with its said two coincident nodal points.

JOHN D. ELMS.

CERTIFICATE OF CORRECTION.

Patent No. 1,943,378.                                   January 16, 1934.

JOHN D. ELMS.

It is hereby certified that error the name of the assignee in the above numbered patent was erroneously described and specified as "Films Revo Corporation" whereas said name should have been described and specified as Felms Revo Corporation, as shown by the records of assignments in this office; and that the said Letters Patent should be read with this correction therein that the same may conform to the record of the case in the Patent Office.

Signed and sealed this 6th day of March, A. D. 1934.

F. M. Hopkins (Seal)                                   Acting Commissioner of Patents.